US006471199B2

(12) United States Patent
Nagai et al.

(10) Patent No.: US 6,471,199 B2
(45) Date of Patent: Oct. 29, 2002

(54) ELECTRIC CLAMP APPARATUS

(75) Inventors: Shigekazu Nagai, Tokyo; Akio Saitoh, Kawaguchi; Hiroshi Yumiba, Ibaraki-ken, all of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/842,927

(22) Filed: Apr. 27, 2001

(65) Prior Publication Data

US 2001/0038175 A1 Nov. 8, 2001

(30) Foreign Application Priority Data

Apr. 28, 2000 (JP) ....................................... 2000-131345

(51) Int. Cl.[7] .................................................. B32Q 3/02

(52) U.S. Cl. ......................... 269/32; 269/228; 269/237; 269/243; 269/285

(58) Field of Search .......................... 269/32, 228, 237, 269/24, 27, 216, 217, 220, 221, 225.6, 233, 93, 94, 238; 74/55, 25, 105, 106

(56) References Cited

U.S. PATENT DOCUMENTS 3,599,957 A * 8/1971 Blatt .......................... 269/233
3,704,879 A * 12/1972 Nishikawa .................. 269/222
4,723,767 A * 2/1988 McPherson .................. 269/32
5,215,295 A * 6/1993 Hoover ........................ 269/32
5,575,462 A * 11/1996 Blatt ........................... 269/32
5,799,932 A * 9/1998 Blatt ........................... 269/32
6,199,846 B1 * 3/2001 Crorey ........................ 269/32

FOREIGN PATENT DOCUMENTS

EP 0 243 599 11/1987

OTHER PUBLICATIONS

Co–Pending U.S. patent application Ser. No. 09/627,036 by Shigekazu Nagai et al. for "Electric Clamp Apparatus," filed on Sep. 29, 2000.

* cited by examiner

*Primary Examiner*—M. Rachuba
*Assistant Examiner*—Daniel Shanley
(74) *Attorney, Agent, or Firm*—Paul A. Guss

(57) ABSTRACT

A gear mechanism has a first gear which is coaxially connected to a drive shaft of a rotary driving source, a second gear which is meshed with the first gear, and a third gear which is meshed with the second gear and which is integrally interlocked with a ball screw nut. Diameters of the first to third gears are set to be smaller than a dimension of an upper body in a widthwise direction and a dimension of a lower body in the widthwise direction.

8 Claims, 4 Drawing Sheets

ELECTRIC CLAMP APPARATUS

BACKGROUND OF THE INVENTION

1. Field of the Invention

The present invention relates to an electric clamp apparatus which makes it possible to clamp a workpiece to be positioned and transported on a carriage, for example, in an automatic assembling line.

2. Description of the Related Art

Conventionally, for example, a workpiece such as an engine is transported by a carriage in an automatic assembling line for automobiles. A variety of machining steps or assembling steps are performed at respective stations.

It is necessary at each of the stations that the positioning is performed to obtain a predetermined position in order to fix the workpiece to a jig. In recent years, a system is adopted, in which a clamp apparatus is provided for the carriage itself, the workpiece is transported while being clamped on the carriage, and only the carriage is positioned at each of the stations.

In this system, a fluid pressure-operated cylinder, for example, a pneumatic cylinder is used as a driving source for driving the clamp apparatus.

In view of the above, the present applicant has proposed an electric clamp apparatus in which the clamping force can be further increased, the complicated arrangement of air piping or the like can be dissolved, and the installation space can be effectively utilized (see Japanese Patent Application No. 11-282195).

SUMMARY OF THE INVENTION

The present invention has been made in relation to the proposal described above, a general object of which is to provide an electric clamp apparatus which makes it possible to realize a small size by forming the entire apparatus to have a flat configuration with a narrow width and which makes it possible to smoothly regulate a range of rotation of an arm by means of a simple structure.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
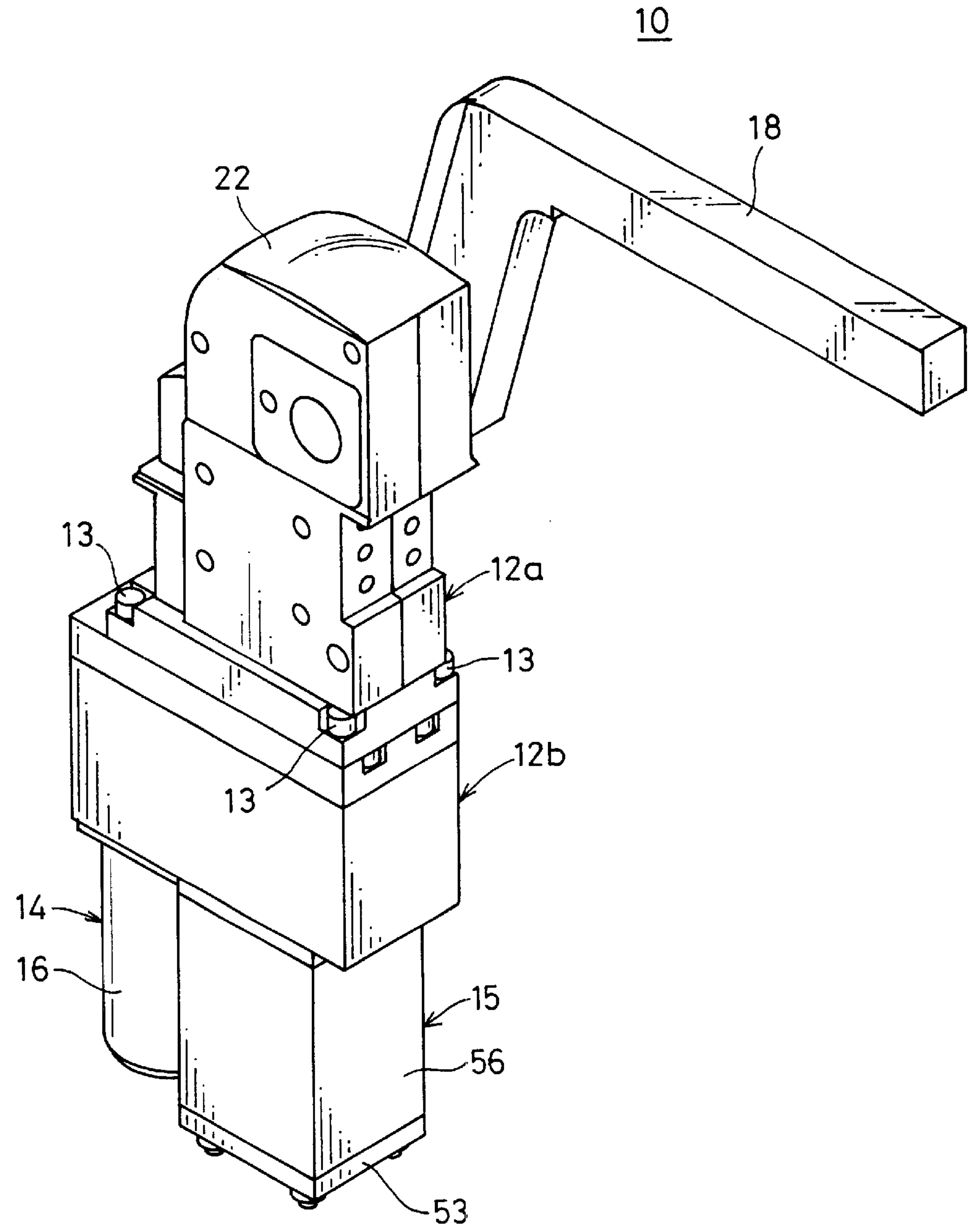
FIG. 1 shows a perspective view illustrating an electric clamp apparatus according to an embodiment of the present invention.

With reference to FIG. 1, reference numeral 10 indicates an electric clamp apparatus according to an embodiment of the present invention.

The electric clamp apparatus 10 comprises an upper body **12*a* which has a flat configuration with a narrow width, a flat lower body 12*b* which is integrally connected to the upper body 12*a* by the aid of screw members 13, a rotary driving section 14 which is connected to a lower portion of the lower body 12*b* while being deviated in one direction, a stopper mechanism 15 which is provided in parallel to the rotary driving section 14 connected to the lower portion of the lower body 12*b*, and a clamp arm 18 which is connected to a bearing section 17 (see FIG. 2) having a rectangular cross section protruding to the outside through a pair of substantially circular openings (not shown) formed through the upper body 12*a*. A cover member 22 described later on is installed to the top of the upper body 12*a***.

The upper body **12*a* and the lower body 12*b*** function as a main body section.

Figure 2:
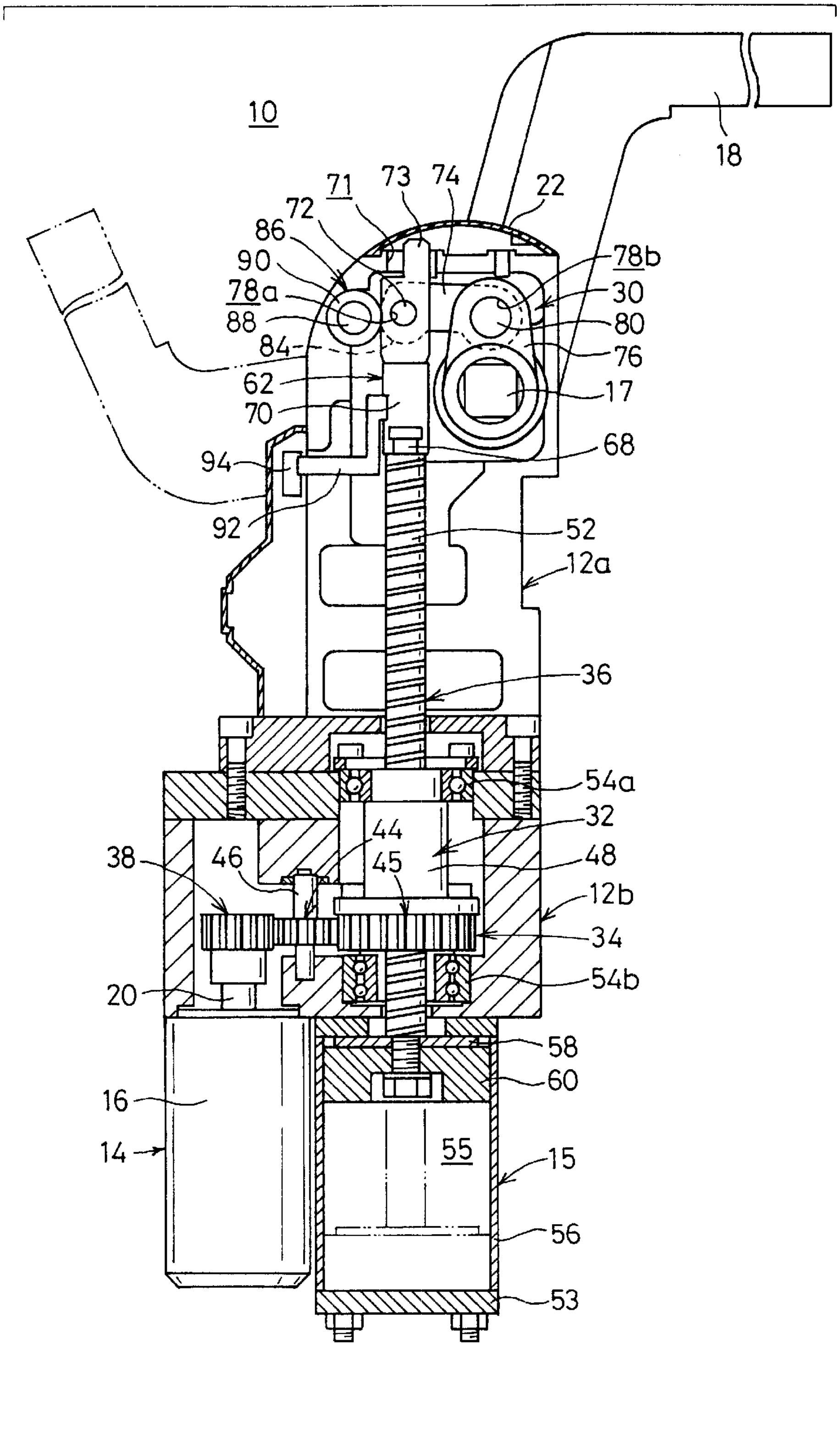
FIG. 2 shows a vertical sectional view taken in an axial direction of the electric clamp apparatus shown in FIG. 1.
Figure 4:
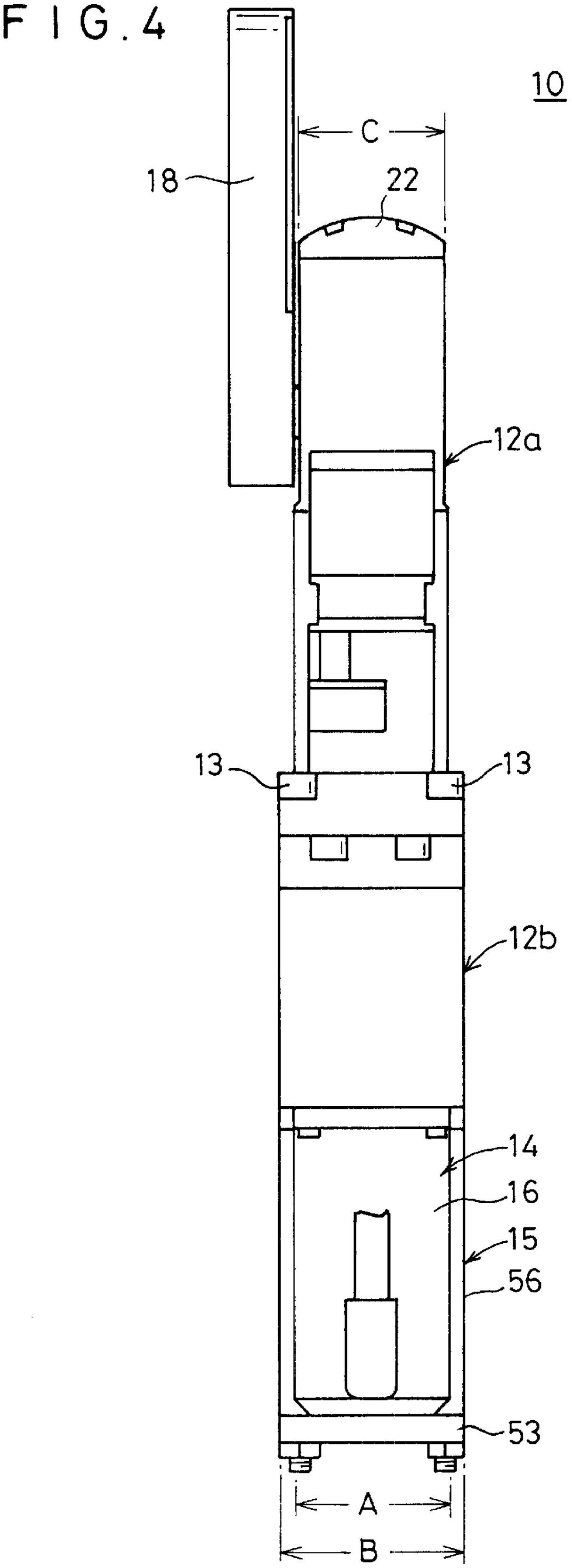
FIG. 4 shows a side view illustrating the electric clamp apparatus shown in FIG. 1.

As shown in FIG. 2, the rotary driving section 14 has a rotary driving source 16 which is composed of, for example, an induction motor or a brushless motor and which is driven and rotated in accordance with an input of an electric signal. As shown in FIG. 4, the rotary driving source 16, which is formed to have a substantially columnar configuration, has its diameter A that is formed to be slightly smaller than the dimension B in the widthwise direction of the lower body **12*b***.

Figure 3:
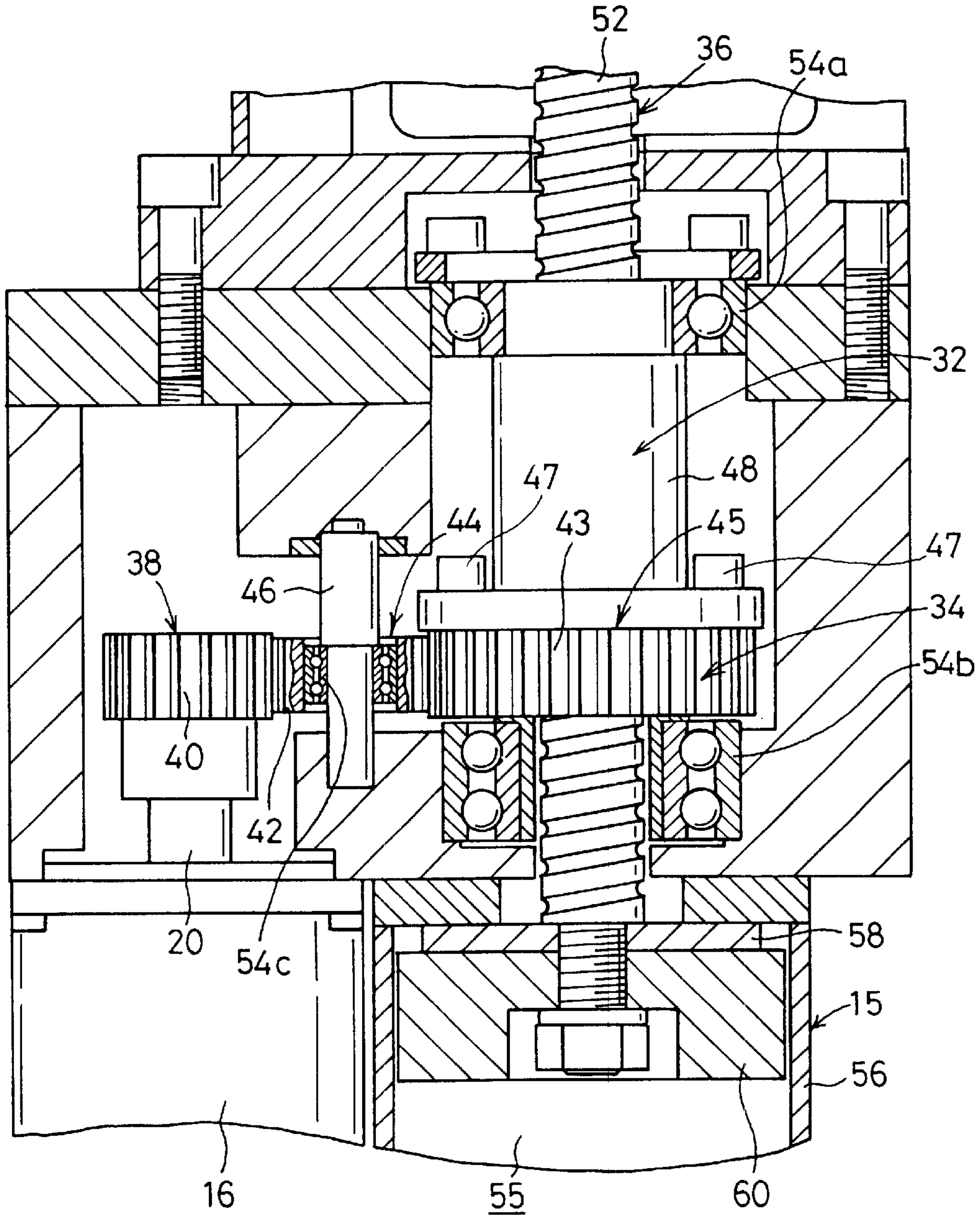
FIG. 3 shows a partial magnified vertical sectional view illustrating the electric clamp apparatus shown in FIG. 2.

As shown in FIG. 3, a rotary driving force-transmitting mechanism 32, which transmits the rotary driving force of the rotary driving source 16 to a toggle link mechanism 30, is provided at the inside of the lower body **12*b*. The rotary driving force-transmitting mechanism 32 comprises a gear mechanism 34 and a ball screw mechanism 36**.

As shown in FIG. 3, the gear mechanism 34 includes a first gear 38 which is coaxially connected to a drive shaft 20 of the rotary driving source 16, a second gear 44 which is formed with second teeth 42 for being meshed with first teeth 40 of the first gear 38 and which is rotatably supported by a pin member 46 disposed substantially in parallel to the axis of the drive shaft 20, and a third gear 45 which is formed with third teeth 43 for being meshed with the second teeth 42 of the second gear 44 and which is designed to have a diameter larger than diameters of the first and second gears 38, 44.

In this arrangement, the diameters of the first to third gears 38, 44, 45 are set to be smaller than the dimension C of the upper body **12*a* in the widthwise direction and the dimension B of the lower body 12*b*** in the widthwise direction. Thus, the dimension of the entire apparatus in the widthwise direction can be suppressed, and the apparatus can be formed to have a flat configuration.

The surface hardness and the roughness can be improved by applying the surface treatment such as shot peening and liquid honing to the surfaces of the first to third teeth 40, 42, 43 of the first to third gears 38, 44, 45. This procedure is preferred in order to keep lubricating oil and oil films on the surfaces of the first to third teeth 40, 42, 43 of the first to third gears 38, 44, 45.

On the other hand, as shown in FIG. 3, the ball screw mechanism 36 includes a ball screw nut 48 which is coaxially connected by the aid of connecting pins 47 and which is rotatably provided integrally with the third gear 45, and a ball screw shaft 52 which is displaceable in the axial direction by being screw-engaged with a penetrating screw hole (not shown) of the ball screw nut 48. The ball screw nut 48 and the third gear 45 are rotatably supported by a first bearing member **54*a* and a second bearing member 54*b* respectively. A third bearing 54*c* for rotatably supporting the second gear 44 is provided for the second gear 44. Accordingly, the second gear 44** is smoothly rotated, and it is possible to suppress the noise.

The ball screw nut 48 is provided with a plurality of balls (not shown) which roll along unillustrated circulating tracks. The ball screw shaft 52 is arranged displaceably in the axial direction in accordance with the rolling action of the balls.

In this arrangement, the third gear 45 and the ball screw nut 48 are connected to one another in an integrated manner by the aid of unillustrated connecting pins. The third gear 45 and the ball screw nut 48 are provided so that they are rotatable in an integrated manner about the axis of the ball screw shaft 52 by the aid of the first and second bearing members 54*a*, 54*b*. Therefore, the ball screw shaft 52 is provided movably upwardly and downwardly in accordance to with the rotating action of the third gear 45 and the ball screw nut 48.

As shown in FIG. 2, a stopper mechanism 15 is connected to a first end of the ball screw shaft 52 disposed on the lower side. The stopper mechanism 15 includes a tube 56 which has a chamber 55 therein closed by a plate 53 and which is formed to have a flat configuration with a narrow width, a stopper plate 58 which is connected to the first end of the ball screw shaft 52 and which makes abutment against an inner wall surface of the chamber 55 disposed on the upper side, and a stopper block 60 which is connected to the first end of the ball screw shaft 52 by the aid of a fixing nut and which is slidably displaceable along the chamber 55. The stopper plate 58 and the stopper block 60 function as a stopper member.

In this arrangement, the stopper block 60 has a substantially hexagonal lateral cross section in the horizontal direction. The chamber 55 has a cross-sectional configuration corresponding to the cross-sectional configuration of the stopper block 60. Therefore, when the stopper block 60 is slidably displaced along the chamber 55, the stopper block 60 exhibits both of the guiding function and the rotation-preventive function for the ball screw shaft 52 in the circumferential direction. The shape of the lateral cross section of the stopper block 60 in the horizontal direction is not limited to the substantial hexagonal configuration. The shape of the lateral cross section of the stopper block 60 may be a non-circular configuration capable of exhibiting the rotation-preventive function including, for example, a spline.

As shown in FIG. 4, the dimension of the tube 56 in the widthwise direction is formed to be substantially the same as the dimension B of the lower body 12*b* in the widthwise direction. Each of the upper body 12*a*, the lower body 12*b*, the rotary driving source 16, and the tube 56 is formed in an integrated manner to have a flat configuration with a narrow width.

The toggle link mechanism 30, which converts the rectilinear motion of the ball screw shaft 52 into the rotary motion of the clamp arm 18 by the aid of a knuckle joint 62, is provided at the second end of the ball screw shaft 52 disposed on the upper side.

The knuckle joint 62 comprises a knuckle pin 68 which has a substantially T-shaped cross section connected to the second end of the ball screw shaft 52, and a knuckle block 70 which has a forked section with branches for being engaged with a head of the knuckle pin 68.

A releasing projection 73, which slightly protrudes from an opening 71 of the upper body 12*a*, is formed in an integrated manner at an upper portion of the knuckle block 70. The cover member 22, which is formed of, for example, a flexible material such as rubber, is installed to the upper body 12*a*. The locked state can be unlocked by means of manual operation by downwardly pressing the releasing projection 73 via the cover member 22.

As shown in FIG. 2, the toggle link mechanism 30 includes a link plate 74 which is connected to an upper portion of the knuckle block 70 by the aid of a first pin member 72, and a support lever 76 which is rotatably is supported by the pair of substantially circular openings (not shown) respectively formed through the upper body 12*a*.

The link plate 74 is installed between the knuckle block 70 and the support lever 76, and it functions to link the knuckle joint 62 and the support lever 76. That is, the link plate 74 is formed with a pair of holes 78*a*, 78*b* which are separated from each other by a predetermined spacing distance. The link plate 74 is connected to the knuckle block 70 by the aid of the first pin member 72 which is rotatably installed to the first hole 78*a*, and it is connected to the support lever 76 by the aid of a second pin member 80 which is rotatably installed to the second hole 78*b*.

The support lever 76 includes the bearing section 17 which has a rectangular cross section, and is formed to protrude in a direction (direction substantially perpendicular to the plane of paper) substantially perpendicular to the axis of the ball screw shaft 52. The bearing section 17 is exposed to the outside from the upper body 12*a* through the unillustrated opening. The clamp arm 18 for clamping an unillustrated workpiece is detachably installed to the bearing section 17. In this arrangement, the support lever 76 is provided to make the rotating action integrally with the clamp arm 18.

The rectilinear motion of the ball screw shaft 52 is transmitted to the support lever 76 via the knuckle joint 62 and the link plate 74. The support lever 76 is provided rotatably by a predetermined angle about the center of rotation of the bearing section 17 protruding through the pair of openings (not shown) formed through the upper body 12*a*.

An unillustrated guide groove for guiding the knuckle block 70 is formed to extend in the vertical direction on the inner wall surface of the upper body 12*a*. A recess, which has a semicircular cross section, is formed at an upper portion of the inner wall surface of the upper body 12*a*. As shown in FIG. 2, a needle roller 86, which is rotatable by being engaged with a circular arc-shaped side surface section 84 of the link plate 74, is provided in the recess. The needle roller 86 comprises a pin member 88 which is fixed to the side of the upper body 12*a*, a ring-shaped roller 90 which is rotatable in a predetermined direction about the center of rotation of the pin member 88, and a plurality of needles (not shown) which are arranged in the circumferential direction between the outer circumferential surface of the pin member 88 and the inner circumferential surface of the roller 90.

A metal detection member 94 is connected to the knuckle block 70 by the aid of a dog 92. A pair of unillustrated sensors, which detect the position of the metal detection member 94 by utilizing the change in impedance in accordance with the approaching action of the metal detection member 94, are provided on the outer wall surface of the upper body 12*a*, The position of rotation of the clamp arm 18 can be detected by sensing the metal detection member 94 by using the unillustrated first sensor.

The electric clamp apparatus 10 according to the embodiment of the present invention is basically constructed as described above. Next, its operation, function, and effect will be explained.

At first, the electric clamp apparatus 10 is fixed to a predetermined position by the aid of an unillustrated fixing mechanism. The following description will be made assuming that the initial position in the unclamping state is established when the stopper block 60 is located at the bottom dead center as indicated by dashed lines in FIG. 2.

After performing the preparatory operation as described above, an unillustrated power source is energized at the initial position to drive and rotate the rotary driving source 16. The first gear 38, which is meshed with the drive shaft 20 of the rotary driving source 16, is rotated about the center of rotation of the drive shaft 20. The second gear 44, which is meshed with the first gear 38, is rotated in a direction opposite to the direction of rotation of the first gear 38.

The second gear 44, which is rotatably supported by the pin member 46, is meshed with the third gear 45. The third gear 45 is rotated integrally with the ball screw nut 48. The ball screw shaft 52, which is screw-engaged with the ball screw nut 48, is moved upwardly in accordance with the rolling action of the plurality of unillustrated balls. Therefore, the stopper plate 58 and the stopper block 60, which are connected to the lower portion of the ball screw shaft 52, are also moved upwardly integrally with the ball screw shaft 52.

In this arrangement, the stopper block 60 is slidably displaced along the chamber 55 of the tube 56 to effect the guiding function for guiding the ball screw shaft 52 in the linear direction.

The rotary driving force of the rotary driving source 16 can be increased by allowing the gear mechanism 34 to intervene between the rotary driving source 16 and the ball screw mechanism 36 as described above. Paradoxically, a miniaturized motor having a small rotary driving force can be used owing to the provision of the gear mechanism 34. As a result, it is possible to miniaturize the entire electric clamp apparatus 10.

The rectilinear motion of the ball screw shaft 52 is transmitted to the toggle link mechanism 30 via the knuckle joint 62. The rectilinear motion is converted into the rotary motion of the clamp arm 18 by the aid of the rotating action of the support lever 76 which constitutes the toggle link mechanism 30.

That is, the force to press the knuckle joint 62 and the link plate 74 upwardly is exerted in accordance with the rectilinear motion of the ball screw shaft 52. By means of the pressing force exerted on the link plate 74, the link plate 74 is rotated by a predetermined angle about the support point of the first pin member 72, and the support lever 76 is rotated clockwise in accordance with the linking action of the link plate 74.

Therefore, the clamp arm 18 is rotated by a predetermined angle about the support point of the bearing section 17 of the support lever 76, and thus the clamping state is achieved, in which the clamp arm 18 clamps the workpiece (not shown). The ball screw shaft 52 is slightly moved upwardly after the clamp arm 18 stops the rotary action to give the clamping state. Accordingly, the stopper plate 58, which is connected to the lower portion of the ball screw shaft 52, abuts against the inner wall surface of the chamber 55 on the upper side to regulate the displacement thereof, arriving at the top dead center at which the displacement terminal position of the ball screw shaft 52 is given (see FIG. 2). The arrival at the top dead center is confirmed by sensing the metal detection member 94 by means of the unillustrated first sensor.

In the clamping state, the energizing state for the rotary driving source 16 is continued. Therefore, the clamping force for gripping the workpiece by the clamp arm 18 is held substantially constantly.

In order to give the unclamping state by canceling the clamping state, the polarity of the current for the rotary driving source 16 is inverted. Accordingly, the first gear 38 is rotated in a direction opposite to the above, and the ball screw shaft 52 is moved downwardly. Thus, the clamp arm 18 is displaced in a direction to make separation from the workpiece. In this procedure, the stopper block 60, which is connected to the lower portion of the ball screw shaft 52, abuts against the plate 53 which constitutes the inner wall surface of the chamber 55 on the lower side. Accordingly, the displacement is regulated, and the initial position is restored.

According to the embodiment of the present invention, the first to third gears 38, 44, 45, which have the diameters smaller than the dimension C of the upper body 12*a* in the widthwise direction and the dimension B of the lower body 12*b* in the widthwise direction, are meshed with each other as the gear mechanism 34. Accordingly, it is possible to provide the sufficient distance between the axes of the drive shaft 20 of the rotary driving source 16 and the ball screw shaft 52. Further, the dimensions C, B of the upper and lower bodies 12*a*, 12*b* in the widthwise direction are suppressed respectively. Accordingly, the entire apparatus can be formed to have the flat configuration with the narrow width, and it is possible to achieve the small size.

In order to achieve the miniaturization of the entire apparatus, for example, it is also conceived that an unillustrated gear installed to the drive shaft 20 of the rotary driving source 16 is directly meshed with an unillustrated gear coupled to the ball screw nut 48. However, when the two gears are directly meshed with each other as described above, the diameters of the gears are increased respectively, if it is intended to set the same distance between the axes as that described above. As a result, an inconvenience arises such that the dimension in the widthwise direction is also increased.

In the embodiment of the present invention, the stopper mechanism 15, which comprises the stopper plate 58 and the stopper block 60, is provided at the first end of the ball screw shaft 52. Accordingly, the range of rotation of the clamp arm 18 can be reliably regulated. Further, the dimension in the widthwise direction can be suppressed, and the entire apparatus can be formed to have the flat configuration with the narrow width.

In this arrangement, the stopper block 60 effects the guiding function to linearly guide the ball screw shaft 52 and the rotation-preventive function to prevent the ball screw shaft 52 from rotation in the circumferential direction.

The stopper mechanism 15 is provided so that the range of rotation of the clamp arm 18 is changeable by removing the plate 53 installed to the tube 56 and exchanging the stopper block 60 with another stopper block (not shown) having a different wall thickness in the axial direction.

The embodiment of the present invention has been explained by using the ball screw mechanism 36 as the driving force-transmitting mechanism. However, there is no limitation thereto. It is a matter of course that an unillustrated feed screw mechanism including a slide screw or the like may be used.

Further, for example, a high viscosity grease, which is composed of a base oil having a kinematic viscosity of not less than 1000 (St), is used as a lubricating oil. Accordingly, the oil film can be maintained at extreme pressure portions including, for example, the gear mechanism 34, the ball screw mechanism 36, and the toggle link mechanism 30. The high viscosity grease has a muffling or silencing effect. An advantage is obtained such that the noise, which is generated from the driving sections such as the gear mechanism 34 and the ball screw mechanism 36, can be suppressed.

In this case, the powder generated by abrasion can be removed by supplying the oil to the sliding portions such as the ball screw shaft 52 by using felt or PVD.

What is claimed is:

1. An electric clamp apparatus capable of clamping a workpiece by using a rotatable clamp arm, said electric clamp apparatus comprising:

a main body section;

a rotary driving source which is driven and rotated in accordance with an electric signal;

a gear mechanism which transmits rotary driving force of said rotary driving source;

a feed screw mechanism which includes a feed screw shaft for converting rotary motion transmitted by said gear mechanism into rectilinear motion; and a toggle link mechanism which converts said rectilinear motion transmitted by said feed screw mechanism into rotary action of said clamp arm, wherein:

said gear mechanism has a first gear which is coaxially connected to a drive shaft of said rotary driving source, a second gear which is provided with second teeth for being meshed with first teeth of said first gear and which is arranged substantially in parallel to an axis of said drive shaft, and a third gear which is provided with third teeth for being meshed with said second teeth of said second gear and which is integrally interlocked with a feed screw nut, and diameters of said first to third gears are set to be smaller than dimensions of said main body section in a widthwise direction.

2. The electric clamp apparatus according to claim 1, wherein a stopper mechanism for regulating a range of rotation of said clamp arm is provided at a first end of said feed screw shaft.

3. The electric clamp apparatus according to claim 1, wherein said diameter of said third gear is set to be larger than said diameters of said first gear and said second gear.

4. The electric clamp apparatus according to claim 2, wherein said stopper mechanism has a dimension thereof in said widthwise direction which is formed to be substantially the same as said dimension of said main body section in said widthwise direction, and said rotary driving source and said stopper mechanism are provided in parallel at a first end of said main body section.

5. The electric clamp apparatus according to claim 2, wherein said stopper mechanism includes a tube which is connected to an end of said main body section, and a stopper member which is slidable along a chamber formed in said tube.

6. The electric clamp apparatus according to claim 5, wherein said stopper member includes a stopper plate and a stopper block, said stopper block has a lateral cross section which is formed to have a non-circular configuration to effect a rotation-preventive function, and said stopper block is slidably displaceable along said chamber which is formed to have a non-circular configuration to effect a guiding function.

7. The electric clamp apparatus according to claim 6, wherein said stopper block is provided exchangeably with another stopper block, and said range of rotation of said clamp arm is changed by exchanging said stopper block with another stopper block having a different wall thickness in an axial direction.

8. The electric clamp apparatus according to claim 1, wherein said feed screw shaft comprises a non-rotating feed screw axially displaceable within said main body section.

* * * * *